United States Patent [19]

Truskalo

[11] Patent Number: 5,218,275
[45] Date of Patent: Jun. 8, 1993

[54] BEAM LANDING LOCATION ERROR CORRECTION ARRANGEMENT

[75] Inventor: Walter Truskalo, Indianapolis, Ind.

[73] Assignee: Thomson Consumer Electronics, Inc., Indianapolis, Ind.

[21] Appl. No.: 862,091

[22] Filed: Apr. 2, 1992

[51] Int. Cl.$^5$ .................. H01J 29/70; H01J 29/76
[52] U.S. Cl. ........................................ 315/368.21
[58] Field of Search ............... 315/368.18, 368.21, 315/368.22, 368.23

[56] References Cited

U.S. PATENT DOCUMENTS

| | | |
|---|---|---|
| 4,318,032 | 3/1982 | Kureha . |
| 4,395,662 | 7/1983 | Sexton, Jr. . |
| 4,500,816 | 2/1985 | Murphy . |
| 4,560,910 | 12/1985 | Midland . |
| 4,675,580 | 6/1987 | Dietz . |
| 5,034,664 | 7/1991 | Fernsler et al. . |

OTHER PUBLICATIONS

Copending U.S. patent application Ser. No. 701,725, in the name of Truskalo, entitled An Arrangement for Correcting Beam Landing Location Error in a Video Display.

*Primary Examiner*—Theodore M. Blum
*Attorney, Agent, or Firm*—Joseph S. Tripoli; Joseph J. Laks; Sammy S. Henig

[57] ABSTRACT

A horizontal rate parabolic voltage generator is responsive to a reset pulse at the horizontal rate for generating a horizontal rate parabolic voltage that includes a pulse in the vicinity of horizontal retrace. The parabolic voltage is coupled to an auxiliary coil mounted on a cathode ray tube to produce a vertical convergence error correction current. The pulse compensates for a slow response time in an amplifier that drives the auxiliary coil. A horizontal rate sawtooth voltage generator may also be responsive to the reset pulse for including a pulse component in its waveform.

15 Claims, 7 Drawing Sheets

BEAM LANDING LOCATION ERROR CORRECTION ARRANGEMENT

The invention relates to a correction arrangement for correcting a beam landing location error in a cathode ray tube (CRT).

In some prior art projection television receivers, a correction signal such as a horizontal rate parabola signal is generated and coupled via an amplifier to an auxiliary coil such as a vertical convergence auxiliary coil of a beam landing location error correction arrangement for correcting, for example, a vertical convergence error. Such parabola generator that includes a ramp generator and an active integrator controlled by a reset pulse, having timings that coincide with the leading and trailing portions of a horizontal flyback pulse, is disclosed in U.S. Pat. No. 5,034,664—Fernsler et al., entitled, PARABOLA GENERATORS WITH AUXILIARY RESET FUNCTION. The reset pulse resets the horizontal rate parabola generator by discharging a capacitor in the ramp or sawtooth generator that is coupled to the active integrator circuit which produces the horizontal rate parabola by integration of the ramp signal at the horizontal scanning rate.

In the vicinity of the end of horizontal retrace, the slope of the current in the auxiliary coil changes its direction or sign. During each of an end portion of horizontal trace and a beginning portion of horizontal trace of the following horizontal period, the rate of change or slope of the current in the auxiliary coil is, typically, at a maximum magnitude.

In a progressive scan television receiver, the horizontal scan frequency is high, for example, $2xf_H$, $f_H$ being about 16 KHZ. Inadequate or limited response time with respect to the parabola signal in the amplifier that drives the auxiliary coil in the $2xf_H$ system is more critical than in a receiver in which the horizontal scan frequency is $f_H$. It may be desirable to compensate for the inadequate response time of the amplifier to obtain the required slope of the current in the auxiliary coil, during each of the beginning and the end portions of horizontal trace.

A video display apparatus, embodying an aspect of the invention, includes a cathode ray tube having an evacuated glass envelope. A display screen is disposed at one end of the envelope and an electron gun assembly is disposed at a second end of the envelope. The electron gun assembly produces an electron beam that forms a raster at electron beam landing locations on the screen. A main horizontal deflection winding and a main vertical deflection winding are disposed on a neck of the cathode ray tube. A horizontal deflection current is generated in the horizontal deflection winding and a vertical deflection current is generated in the vertical deflection winding for producing a main deflection field in a beam path of the electron beam that varies in a manner to vary the electron beam landing location. A parabola signal synchronized to one of the deflection currents is generated in a parabola signal generator. The parabola signal includes a pulse portion in the vicinity of a retrace interval of the one deflection current. An amplifier responsive to the output parabola signal generates a current in an auxiliary deflection coil that produces a second field in the beam path. The waveform of the second field varies in accordance with the variation of the beam landing location to correct for an electron beam landing error.

Advantageously, the pulse portion controls the response of the amplifier during an end and a beginning portion of a trace interval of the one deflection current. The pulse portion provides a sufficiently large slope of the current in the auxiliary coil that is required during each of the end and beginning portions of the trace interval.

A video display deflection apparatus, embodying an inventive feature, includes a cathode ray tube. A main horizontal deflection winding and a main vertical deflection winding are disposed on a neck of the cathode ray tube. A signal generator generates one of a first parabola signal and a first sawtooth signal that is synchronized to a deflection current. A first pulse signal is generated in a vicinity of a peak amplitude of the one signal. The pulse signal is coupled to the signal generator for controlling the peak amplitude of the one signal in accordance with an amplitude of the pulse signal. An amplifier is responsive to the one signal for generating a current in a coil disposed on a neck of the cathode ray tube to correct for a beam landing error.

Figure 1:
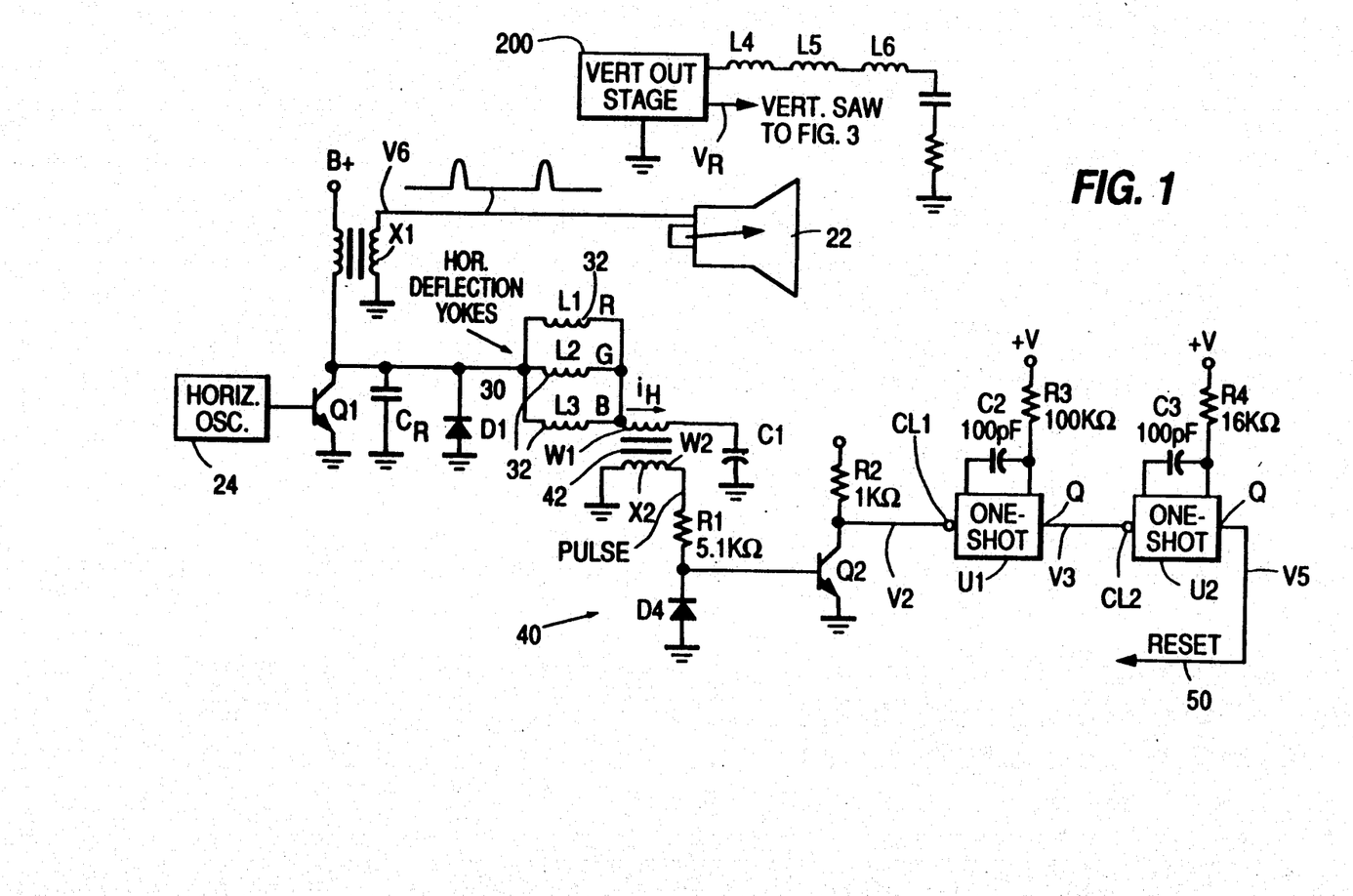
FIG. 1 is a schematic block diagram illustrating the generation of a reset signal from a horizontal deflection current.

In FIG. 1, a CRT 22 of a projection television receiver produces an electron beam. Horizontal and vertical deflection coils cause the beam to scan beam landing locations across the screen of CRT 22, in horizontal lines which are vertically displaced to form a raster. A horizontal oscillator 24 is coupled to a horizontal output transistor Q1 having a collector that is coupled to a horizontal flyback transformer X1. The emitter of transistor Q1 is grounded. A signal is applied to the base of transistor Q1 to cause transistor Q1 to switch at the frequency $2xf_H$ and to conduct from a B+ power supply of +140 volts through transformer X1. Transformer X1 may have various secondary windings for producing, for example, a flyback, filament output pulse V6, during retrace, as shown generally in FIG. 1. The collector of transistor Q1 is coupled to a damper diode D1, a retrace capacitor $C_R$ and a parallel arrangement of main horizontal deflection coils L1, L2 and L3 having, each, an inductance of 750 $\mu$H which produce horizontal deflection fields for scanning the beams over a repetitive scanning period in each CRT of the receiver. A trace capacitor C1 is coupled in series with a parallel arrangement of the horizontal deflection coils. A ramp, horizontal deflection current $i_H$ causes the electron beam to scan from a maximum deflection at one side of the screen, through zero deflection at the center of the screen, to maximum deflection of opposite polarity at the opposite side of the screen.

Horizontal deflection coils L1, L2 and L3 are coupled in parallel, one for each of the red, blue and green CRTs of the projection television receiver. However, in a television apparatus having only one horizontal deflection coil, only one coil would be used. In the projection television receiver, separate horizontal deflection coils L1, L2 and L3 are needed for each CRT, and these may be coupled in parallel as shown in FIG. 1. Main vertical deflection coils L4, L5 and L6 provide vertical deflection in the CRTs.

Main horizontal deflection current $i_H$ that flows through the parallel arrangement of coils L1, L2 and L3 that is coupled in series with a primary winding W1 of transformer X2 is about 10A peak-to-peak, and shaped substantially as a sawtooth current at the horizontal scan frequency. The horizontal scan frequency is $2xf_H$, or about 31, 500 Hz, having a period of about 32 microseconds.

Transformer X2 is a bead transformer in the form of a toroidal magnetically permeable core CORE having primary winding W1 that is coupled in series with the parallel arrangement of deflection coils L1, L2 and L3. Transformer X2 has, for example, winding turns or wraps forming a secondary winding W2. The toroidal core of transformer X2 saturates when current $i_H$ is at about $i_H=1A$ in the primary winding. As a result of changes in flux in transformer X2, from an instant prior to a time when zero crossing of deflection current $i_H$ occurs to an instant after the zero crossing occurs, at the center of horizontal scan or trace, secondary winding W2 produces a voltage pulse PULSE of about 7 V.

Pulse PULSE produced in the secondary winding W2 of toroidal transformer X2 of FIG. 1 is coupled to the base of a transistor Q2 through a resistor R1 and clamped substantially positive relative to ground by a diode D4. The collector of transistor Q2 is coupled to a DC supply voltage of, for example 15VDC via a load resistor R2. Transistor Q2 produces a low going square pulse V2 on its collector. The collector of transistor Q2 is coupled to a triggering, low-true input CL1 of a first monostable multivibrator or one-shot U1. One-shot U1 generates a high going pulse V3 on its Q output.

One-shot U1 determines a length of a period between pulse PULSE, that is related to the zero cross of current $i_H$ through the parallel arrangement of main deflection coils L1, L2 and L3, and a leading edge of a reset pulse V5. Pulse V5 occurs on the dropping or trailing edge of pulse V3. This time period is set by an R−C time constant of a capacitor C2 and a resistor R3, coupled between the appropriate inputs to one-shot U1 and the positive supply voltage V+. The precise time period established by one-shot U1 is adjusted for setting up the timing of reset pulse V5 relative to flyback pulse V6.

The Q or positive going output of one-shot U1 is coupled to a triggering, low going input CL2 of a second one-shot U2. One-shot U2 generates reset pulse V5 at the trailing edge of delay pulse V3 produced in one-shot U1. The second one-shot, U2 has a time constant defined by a capacitor C3 and a resistor R4, preferably about 4 microseconds long. The output of one-shot U2 is coupled to a line 50 to develop pulse V5 on line 50.

Figure 2:
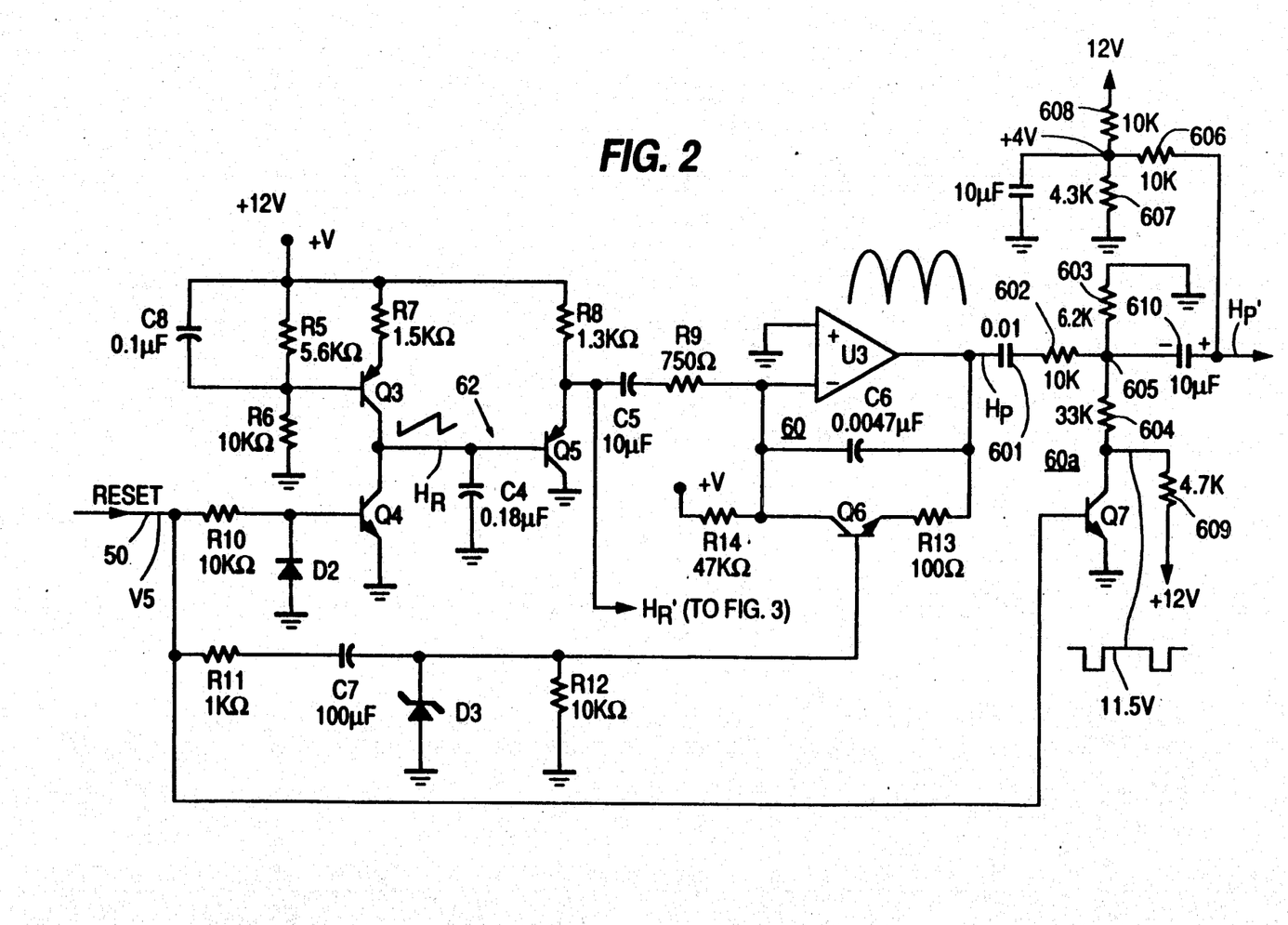
FIG. 2 is a schematic diagram, illustrating a sawtooth generator, and a parabola generator that is responsive to the reset signal of FIG. 1 and that generates a parabola signal having a pulse portion, according to the invention.
Figure 3:
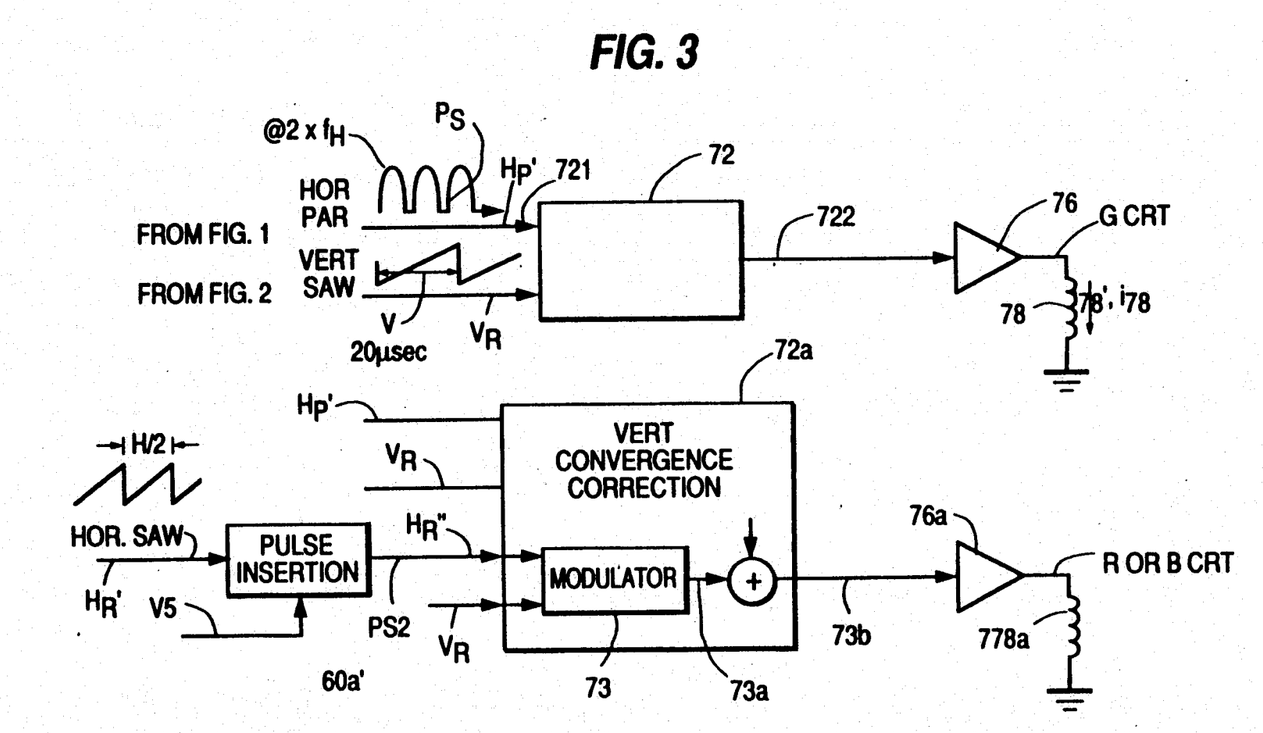
FIG. 3 is a schematic block diagram illustrating the application of the output of the sawtooth generator and the parabola generator produced in the arrangement of FIG. 2 to an amplifier that drives a vertical convergence coil.

FIG. 2 illustrates a ramp generating section 62 responsive to pulse V5 of FIG. 1 and a parabola generating section 60 that includes a pulse inserting section 60a, embodying an aspect of the invention. FIG. 3 illustrates a vertical convergence arrangement 201. Similar symbols and numerals in FIGS. 1, 2, and 3 indicate similar items or functions.

Parabola generating section 60 of FIG. 2 is AC coupled to a ramp signal $H_R$ from ramp section 62, and produces a parabola signal $H_p$ by integration of the ramp. The way pulse V5 and parabola signal $H_p$ are generated is described in detail in a copending U.S. patent application Ser. No. 701,725, entitled AN ARRANGEMENT FOR CORRECTING BEAM LANDING LOCATION ERROR IN A VIDEO DISPLAY, in the name of Truskalo, that is incorporated by reference herein.

In accordance with an aspect of the invention, signal $H_p$ is AC-coupled via a capacitor 601 to a pulse inserting section 60a. Section 60a includes a circuit branch of a resistor 602, a resistor 604 and a switched clamping transistor Q7. A pull-up resistor 609 is coupled to the collector of transistor Q7 to develop a collector voltage of transistor Q7 when transistor Q7 is nonconductive. Transistor Q7 is turned on by pulse V5, prior to the end of horizontal trace, and is turned off, after the beginning of horizontal trace of the following cycle. Consequently, a negative-going pulse voltage is developed at the collector of transistor Q7. The magnitude of the pulse voltage at the collector of transistor Q7 is close to 12 $V_{p-p}$.

The pulse voltage at the collector of transistor Q7 is combined with signal $H_p$ at a junction terminal 605. Terminal 605 is coupled between resistor 602 and 604, is AC-coupled via capacitor 610 to an input 721 of a conventional modulator or vertical convergence correction circuit 72 of FIG. 3 to develop at input 721 a parabola signal $H_p'$ that includes a pulse PS produced by transistor Q7 of FIG. 2. Similar symbols and numerals in FIGS. 1-3 indicate similar items or functions. A D.C. component of signal $H_p'$ of FIG. 2 is determined by resistors of a voltage divider formed by resistors 606, 607 and 608 and a D.C. voltage of +12 volts.

A vertical sawtooth signal $V_R$, obtained from a vertical output stage 200 of FIG. 1, is also coupled to vertical convergence correction circuit 72. An output signal of circuit 72 that contains at least a component signal obtained by modulating signal $H_p'$ with signal $V_R$ is coupled via a conventional power amplifier 76 to an auxiliary vertical convergence coil 78 of the green CRT, as shown in FIG. 3. The waveform of a horizontal parabola current $i_{78}$ of FIG. 3 in coil 78 of FIG. 3 varies in a vertical rate sawtooth manner to vary a waveform of a magnetic field, not shown, produced by coil 78 for providing vertical convergence.

Figure 4:
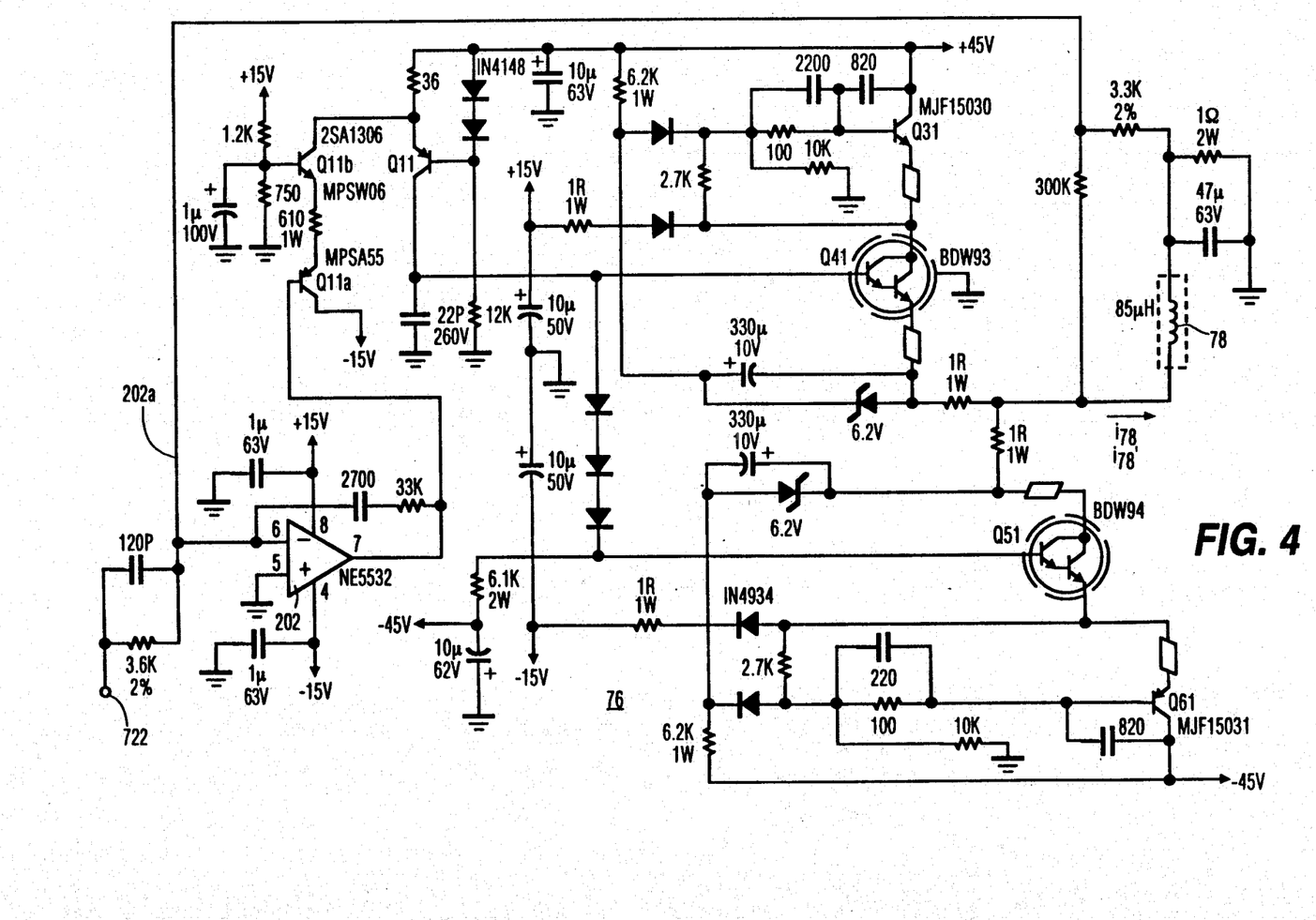
FIG. 4 illustrates a schematic diagram of the amplifier of FIG. 3.

Amplifier 76 operates as a voltage-to-current converter. The detailed schematic of amplifier 76 is shown in FIG. 4. Similar symbols and numerals in FIGS. 1-4 indicate similar items or functions. In amplifier 76 of FIG. 4, a signal 722 of circuit 72 is coupled via an amplifier stage 202, and stages formed by transistors Q11a, Q11b and Q11 to the base of an output transistor Q41 and to a base of an output transistor Q51. The emitters of transistors Q41 and Q51 are coupled to coil 78 to produce current $i_{78}$. A current feedback signal 202a is coupled back to amplifier stage 202. The operation of the aforementioned stages of amplifier 76 is similar to that described in U.S. Pat. No. 4,961,032 in the name of Rodriguez-Cavazos, entitled, DUAL POWER SOURCE OUTPUT AMPLIFIER, that is incorporated by reference herein.

Figure 5A:
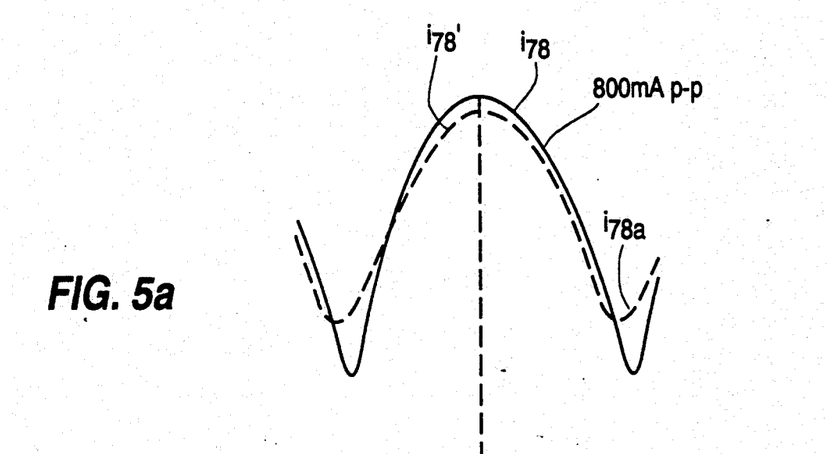
FIGS. 5a and 5b illustrate waveforms useful for explaining the parabola generator of FIG. 2.
Figure 5B:
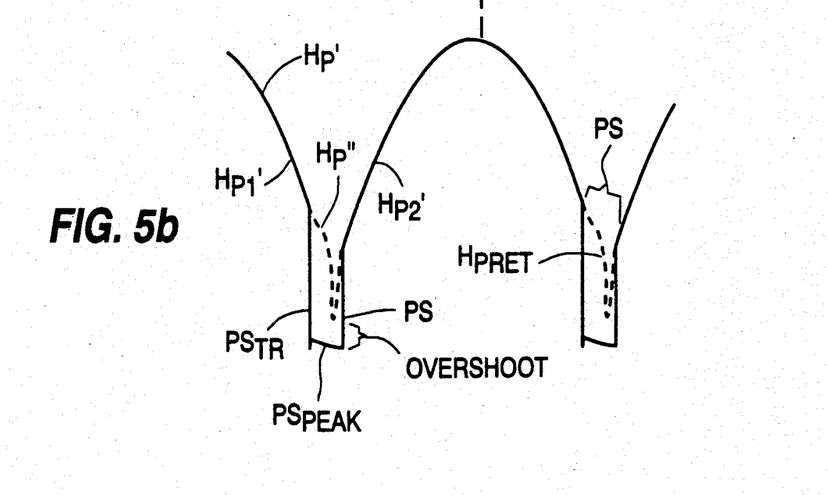

FIGS. 5a and 5b illustrate waveforms useful for explaining the operation of the circuits of FIGS. 1-4. Similar symbols and numerals in FIGS. 1-4 and 5a-5b indicate similar items or functions. FIG. 5b illustrates in solid line the waveform of signal $H_p'$ that includes a negative going pulse PS, during the occurrence of pulse V5 of FIG. 1. Pulse PS is produced by transistor Q7, when conductive. A waveform $H_p''$ of FIG. 5b is shown in broken lines, for illustrative purpose only. Waveform $H_p''$ would have been developed at input 721 of FIG. 3 by signal $H_P$ had pulse PS not been inserted. A portion $H_{PRET}$ of waveform $H_p''$ is narrower and at a smaller amplitude than pulse PS. Thus, pulse PS overlaps portion $H_{PRET}$ that is substituted by pulse PS.

FIG. 5a illustrates in solid line the waveform of current $i_{78}$ of FIG. 4, when pulse PS is inserted. For illustrative purpose only, a current $i_{78}'$ represents in a broken line the waveform of the current in coil 78 of FIG. 4 that would have been obtained, had pulse PS of FIG. 5b not been inserted. The waveforms in FIG. 5a are those that occur approximately at the beginning of vertical trace. It should be understood that the amplitude of current $i_{78}$ or $i_{78}'$ varies in a vertical rate sawtooth manner.

Pulse PS of FIG. 5b produces an inverted V-shaped portion $i_{78a}$ of FIG. 5a in the vicinity of horizontal retrace. Advantageously, portion $i_{78a}$ has a substantially faster rate of change during a beginning portion of horizontal trace of the following cycle than without a compensation effect of pulse PS. Thus, portion $i_{78a}$ provides a closer to an ideal waveform, with respect to vertical convergence error, than portion $i_{78a}'$. Advantageously, the faster rate of change of current portion $i_{78a}$ relative to that of portion $i_{78a}'$ is obtained by an overshoot portion OVERSHOOT of pulse PS to compensate for the relatively slow response time of amplifier 76. The compensation provided by pulse PS is obtained because of a larger peak amplitude $PS_{PEAK}$ of FIG. 5b, the large pulse-width and an early transition edge $PS_{TR}$ of pulse PS FIG. 5b relative to those of portion $H_{PRET}$. As a result, a larger peak amplitude of current $i_{78}$ of FIG. 5a in the vicinity of retrace is obtained.

Figure 7A:
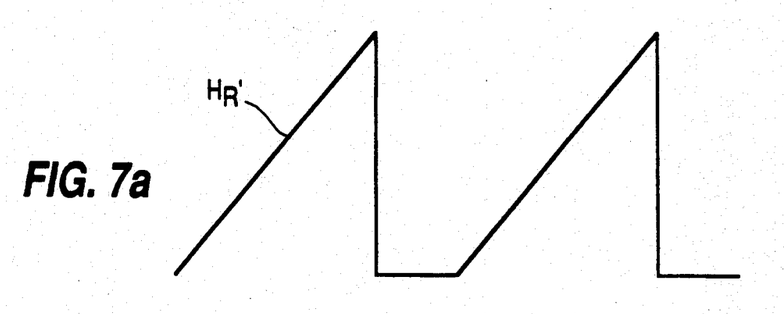
FIGS. 7a and 7b illustrate waveforms useful for explaining the way a pulse portion is inserted in a sawtooth signal of the arrangement of FIG. 3.
Figure 7B:
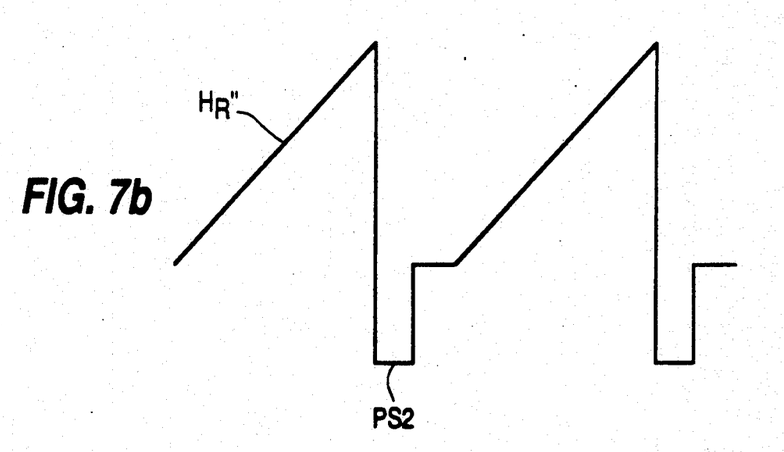

Vertical convergence correction for a given one of the blue and red CRT's is provided by a conventional vertical convergence circuit 72a of FIG. 3. In FIG. 3, a horizontal sawtooth signal $H_R''$ is modulated in a modulator 73 by vertical rate signal $V_R$. A modulated output signal 73a of modulator 73 is summed with an output of a modulator, not shown, of circuit 72a that operates similarly to that described with respect to circuit 72. A resulting output signal 73b of circuit 72a is coupled via an amplifier 76a to a vertical convergence coil 778a of, for example, the blue CRT. The red and blue CRT may require a lower degree of compensation by pulse PS than the green CRT. Therefore, in accordance with an inventive feature, a section 60a' that is similar to section 60a of FIG. 2 is used for inserting a pulse PS2 at a predetermined magnitude of FIG. 3 to a waveform of a horizontal sawtooth signal $H_R'$ of FIG. 2 for producing horizontal sawtooth signal $H_R''$. The effect of the pulse PS2 of signal $H_R''$ on the current in coil 778a is opposite to that of pulse PS. In this way, pulse PS2 prevents in the blue and red CRT over-compensation by pulse PS. The waveform of signal $H_R'$ is shown in FIG. 7a and that of signal $H_R''$ is shown in FIG. 7b. Similar symbols and numerals in FIGS. 2, 3, 7a and 7b indicate similar items or functions.

Ramp generating section 62 of FIG. 2 includes a constant current supply source, transistor Q3, which is a PNP transistor with its emitter coupled to the positive supply voltage V+ through a series resistor R7. The base of transistor Q3 is set at a predetermined voltage (about 5.4 V) by the voltage divider defined by resistors R5 and R6, coupled in series, between the supply voltage B+ and ground. A capacitor C8 decouples the base of transistor Q3 from the positive supply. Transistor Q3 conducts at a constant current level regardless of any changes in the voltage at its collector. The constant current from the collector of transistor Q3 charges capacitor C4 so long as a transistor Q4 is not turned on by pulse V5. Thus, pulse V5 synchronizes ramp generating section 62. The result is that each portion of signal $H_R$, throughout horizontal trace, occurs at a corresponding time that is determined by pulse V5.

Figure 6:
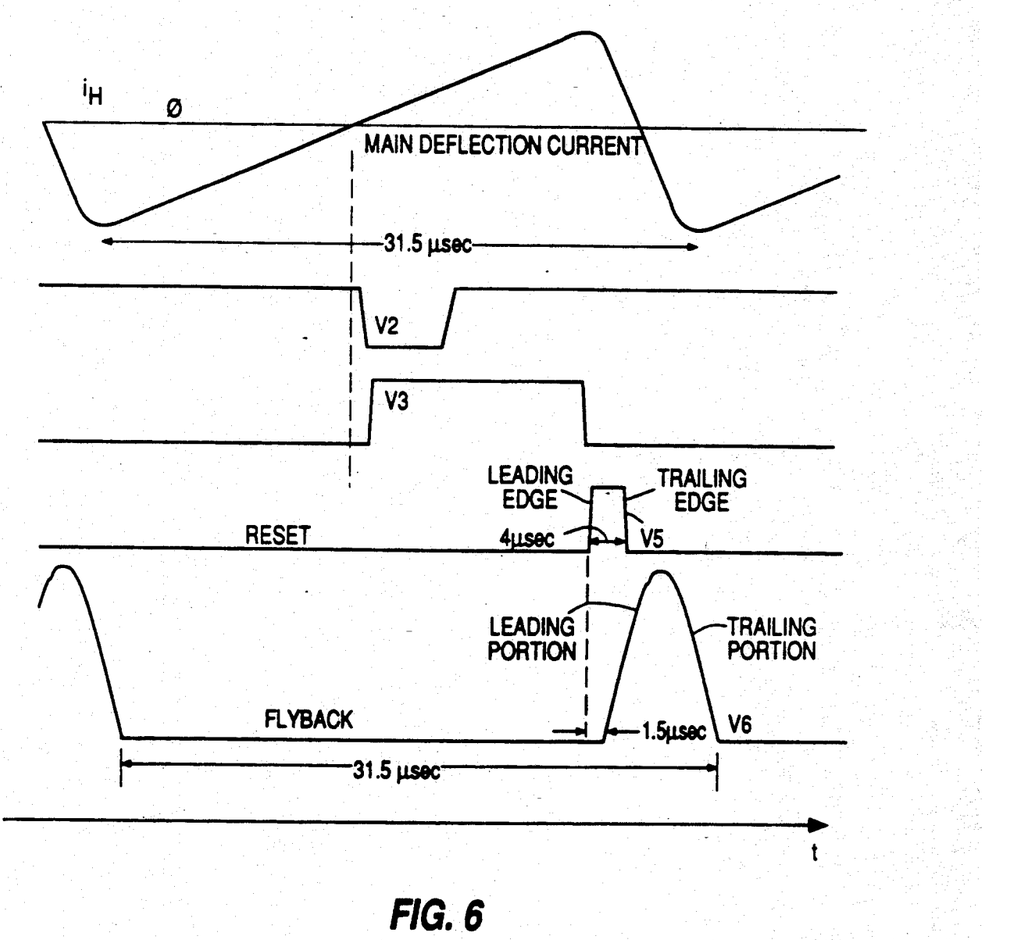
FIG. 6 illustrates additional waveforms useful for explaining the operation of the parabola generator of FIG. 2.

FIG. 6 illustrates waveforms useful for explaining the operation of parabola generating section 60 of FIG. 2. Similar symbols and numerals in FIGS. 1-4, 5a, 5b and 6 indicate similar items or functions. The leading edge of reset pulse V5 of FIG. 6 occurs slightly before the flyback or retrace pulse V6. Thus, pulse V5 is time shifted in a phase advance manner relative to retrace pulse V6 and in a phase delay manner relative to the pulse produced in transformer X2 of FIG. 2. Because reset pulse V5 is produced by sensing the zero crossing of horizontal deflection current $i_H$, variation in the phase of current $i_H$ will, advantageously, produce a corresponding phase shift of pulse V5. Moreover, reset timings of sections 62 and 60 is closely related to the particular scan line to which the flyback applies, and the correction output is accurately timed to the scan line. Horizontal rate reset pulse V5 resets the correction circuit of FIG. 2 at an accurately controlled time after the zero crossing of the main horizontal deflection current $i_H$.

Positive reset pulse V5 on line 50 is coupled to the base of switching transistor Q4 through a series resistor R10, and is clamped positive relative to ground by a diode D2. Transistor Q4 is coupled in parallel with capacitor C4, and conducts during reset, when pulse V5 is generated, to discharge capacitor C4, and to reset the ramp voltage to zero volts. In this manner, the voltage across capacitor C4 defines sawtooth signal $H_R$ at the horizontal scanning frequency.

Capacitor C4 is coupled to the base of a PNP transistor Q5. Transistor Q5 is arranged with a series resistor R8 as a follower amplifier, with the emitter of transistor Q5 tracking the sawtooth voltage across capacitor C4. The emitter of transistor Q5 is AC coupled through a series capacitor C5 and a series resistor R9 to an inverting input of an operational amplifier U3. Amplifier U3 is coupled to a feedback capacitor C6, and accordingly, functions to integrate the AC sawtooth signal from the follower amplifier of transistor Q5. The output of amplifier U3 is parabola signal $H_P$ at the horizontal rate.

Preferably, reset pulse V5 is arranged as shown in FIG. 2 to discharge feedback capacitor C6 as well as the ramp signal capacitor C4. When the feedback capacitor is discharged, amplifier U3 is effectively arranged as a follower amplifier, causing the output to be set to the voltage level of the non-inverting input, i.e., to ground. Feedback capacitor C6 is discharged by a switching transistor C6, coupled in series with a resistor R13 and in parallel with capacitor C6. The collector of transistor Q6 is coupled to the positive supply voltage V+ through resistor R14 such that resistors R13 and R14 bias transistor Q6.

Because the feedback capacitor C6 is smaller than the ramp capacitor C4, it can be discharged quickly. Preferably, capacitor C6 is discharged at the leading edge of reset pulse V5. Reset pulse V5, which is a positive square pulse on line 50, is coupled to the base of transistor Q6 through a series resistor R11, a series capacitor C7 and a parallel resistor R12. Capacitor C7 and resistor R12 together define a differentiator that generates a short high going pulse at the rising edge of reset pulse V5 and a short low going pulse at the dropping edge. The low going pulse is clamped relative to ground by a diode D3, which can be a zener diode as shown, thereby also limiting the positive voltage at the base of transistor Q6. During the high going differentiated pulse, capacitor C6 is discharged and the feedback capacitor is discharged, setting the output of amplifier U3 to zero.

Because the ramp generator is reset and the parabola generator is reset by the circuit shown, there is no tendency of the correction circuit to accumulate an error. Coupling between vertical rate occurrences and the correction circuit is cancelled at every horizontal scan period, and the correction circuit recovers quickly from disturbances such as channel changes, as explained in detail in the Fernsler et al., patent that is incorporated by reference herein.

The leading edge of pulse V5 of FIG. 6, advantageously, precedes the leading portion of pulse V6 by, for example, 1.5 microseconds. The trailing edge of pulse V5, advantageously, also precedes the trailing portion of pulse V6. Thus, each of the waveforms of ramp signal $H_R$ of FIG. 2 and prarbola signal $H_P$ occurs earlier in the deflection cycle than if the timings of pulse V5 were to coincide with the timings of pulse V6. The result in that the waveform of the field produced by current $i_{78}$ in coil 78 is synchronized to pulse V5. In this way, a delay via amplifier 76 that may be more critical at the higher horizontal scan rate of $2 \times f_H$ is, advantageously, compensated.

What is claimed is:

1. A video display deflection apparatus, comprising:
   a cathode ray tube including an evacuated glass envelope, a display screen disposed at one of said envelope and an electron gun assembly disposed at a second end of said envelope, said electron gun assembly producing an electron beam that forms a raster at electron beam landing locations on said screen;
   a main deflection winding disposed on a neck of said cathode ray tube;
   means for generating a deflection current in said deflection winding for producing a main deflection field in a beam path of said electron beam that varies in a manner to vary the electron beam landing location;
   a signal generator for generating a first parabola signal that is synchronized to said deflection current;
   means synchronized to said deflection current for generating a first pulse signal during a retrace interval, said pulse signal being coupled to said signal generator for controlling, during said retrace interval, a peak amplitude of said first parabola signal in accordance with an amplitude of said pulse signal; and
   an amplifier responsive to said one signal for generating a current in an auxiliary deflection coil disposed on said neck to correct for a beam landing error in accordance with said first parabola signal.

2. An apparatus according to claim 1 wherein said pulse signal increases a rate of change of said auxiliary deflection coil current at a beginning of a trace interval of said deflection current.

3. An apparatus according to claim 1 further comprising, means for generating a second parabola signal that is coupled to said signal generator to generate therefrom said first parabola signal such that a waveform of said second parabola signal is unaffected by said pulse signal throughout each period of said second parabola signal.

4. An apparatus according to claim 1 wherein said signal generator comprises, a capacitor for producing a second parabola signal in said capacitor having a waveform that is determined by a value of said capacitor, switching means for clamping a capacitor voltage that is developed in said capacitor and means responsive to said pulse signal and to said capacitor voltage for generating said first parabola signal.

5. An apparatus according to claim 1 wherein said auxiliary deflection coil comprises a vertical convergence correction coil.

6. An apparatus according to claim 1 further comprising, means for generating a sawtooth signal that is synchronized to a transition edge of said pulse signal, said sawtooth signal being coupled to said signal generator for generating therefrom said first parabola signal.

7. An apparatus according to claim 6 further comprising, an integrator responsive to said sawtooth signal for generating a second parabolic signal that is coupled to said signal generator.

8. An apparatus according to claim 1 further comprising, means for generating a reset signal wherein said signal generator is responsive to said reset signal for generating said first parabola signal that is reset when said reset signal occurs.

9. An apparatus according to claim 1 wherein remote from said peak amplitude of said first parabola signal said pulse signal has little effect on said first parabola signal.

10. An apparatus according to claim 1 wherein between a leading edge and a trailing edge of said pulse signal said peak amplitude of said first parabola signal occurs.

11. An apparatus according to claim 1 wherein said deflection winding comprises a horizontal deflection winding.

12. An apparatus according to claim 1 wherein said first parabola signal varies in a horizontal rate parabolic manner.

13. A video display deflection apparatus, comprising:
    a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
    means for generating a first deflection rate signal;
    means for generating a pulse signal timed to occur during a retrace interval of said first deflection rate signal;
    means for combining said deflection rate signal and said pulse signal to generate a combined deflection rate signal such that a peak amplitude of said combined deflection rate signal that occurs during said retrace interval is determined in accordance with an amplitude of said pulse signal; and a deflection amplifier responsive to said combined signal and coupled to a winding that is mounted on a neck of said tube for generating a magnetic field in a path of said electron beam in a manner to correct for a beam landing error.

14. A video display deflection apparatus, comprising:

a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;

a main deflection winding disposed on a neck of said cathode ray tube;

means for generating a deflection current in said deflection winding for producing a main deflection field in a beam path of said electron beam that varies in a manner to vary the electron beam landing location;

a signal generator for generating a sawtooth signal that is synchronized to said deflection current;

means synchronized to said deflection current for generating a first pulse signal during a retrace interval of said sawtooth signal, said pulse signal being coupled to said signal generator for controlling a peak amplitude of said sawtooth signal in accordance with an amplitude of said pulse signal; and an amplifier responsive to said sawtooth signal for generating a current in an auxiliary deflection coil dispersed on said neck to correct for a beam landing error in accordance with said sawtooth signal.

15. A video display deflection apparatus, comprising:

a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;

a main deflection winding disposed on a neck of said cathode ray tube;

mean for generating a deflection current in said deflection winding for producing a main deflection field in a beam path of said electron beam that varies in a manner to vary the electron beam landing location;

an integrator for generating a first parabola signal, during a trace interval of a deflection cycle;

first switching means synchronized to said deflection current and coupled to said integrator for initializing said integrator, during a retrace interval of said deflection current;

means synchronized to said deflection current for generating a pulse signal having a predetermined amplitude, during said retrace interval;

means for combining said pulse and first parabola signals to generate a second parabola signal having a retrace portion with an amplitude that is controlled in accordance with said amplitude of said pulse signal; and an amplifier responsive to said second parabola signal for generating a current in an auxiliary deflection coil disposed on said neck to correct for a beam landing error in accordance with said second parabola signal.

* * * * *